Oct. 17, 1950      F. VORSANGER      2,526,308
MULTIPLE COMPARTMENT CONDIMENT HOLDER
Filed June 6, 1946      2 Sheets-Sheet 1
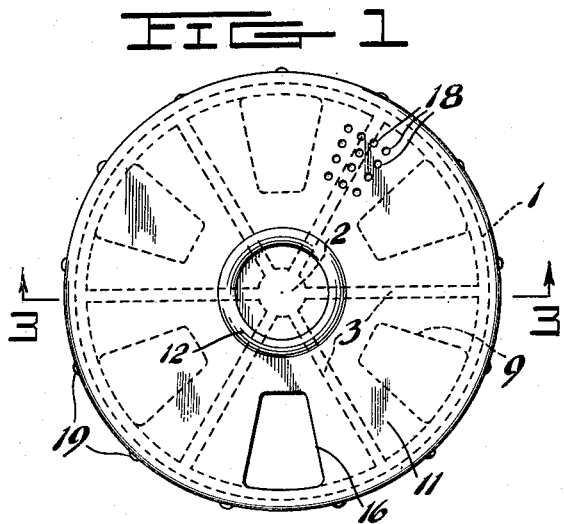
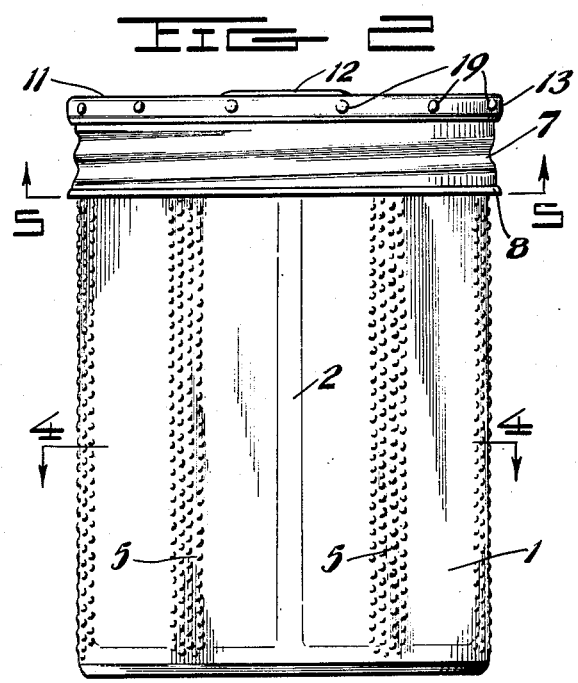
Inventor
*Fritz Vorsanger*
By *Clarence A. O'Brien and Harvey B. Jackson*
Attorneys Oct. 17, 1950      F. VORSANGER      2,526,308
MULTIPLE COMPARTMENT CONDIMENT HOLDER
Filed June 6, 1946      2 Sheets-Sheet 2
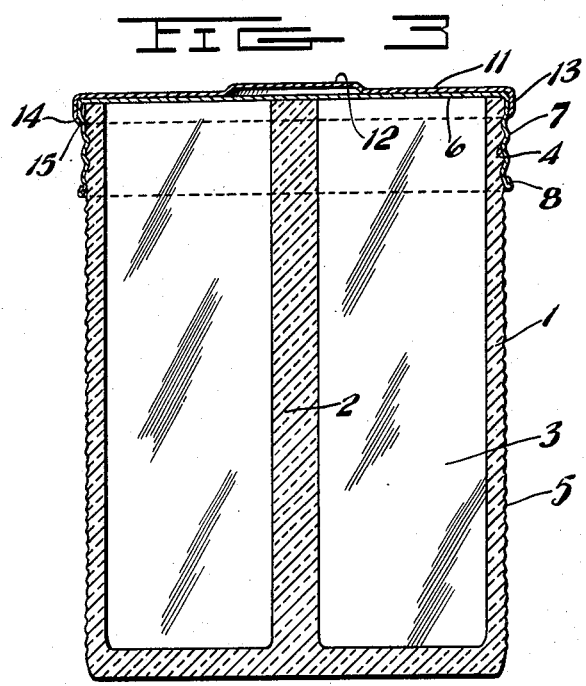
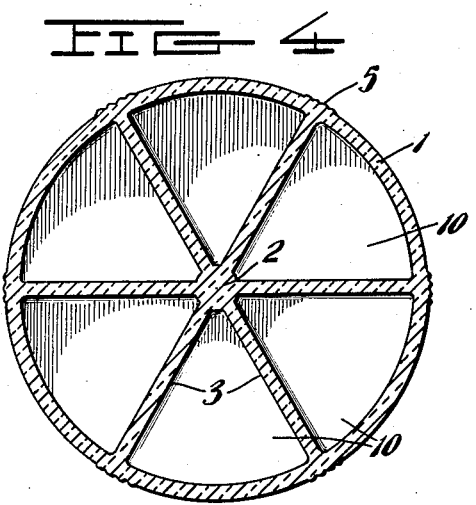
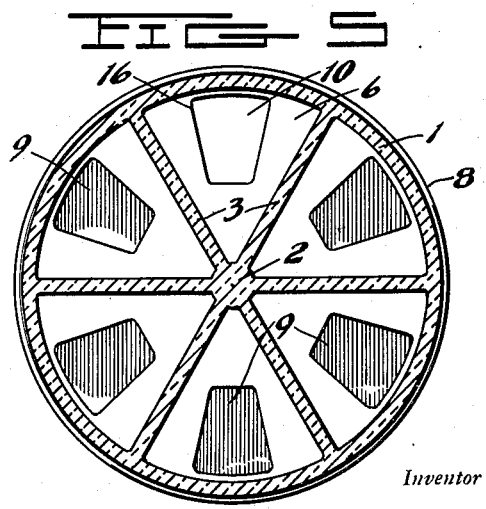
Inventor
*Fritz Vorsanger*
By *Clarence A. O'Brien and Harvey B. Jacobson*
Attorneys Patented Oct. 17, 1950

2,526,308

UNITED STATES PATENT OFFICE 2,526,308

MULTIPLE COMPARTMENT
CONDIMENT HOLDER

Fritz Vorsanger, Englewood, N. J.

Application June 6, 1946, Serial No. 674,709

1 Claim. (Cl. 222—142.9)

This invention relates to improvements in multiple compartment condiment holders.

An object of the invention is to provide an improved multiple compartment condiment holder formed of transparent material and provided with a plurality of radially extending integral partitions forming condiment holding compartments, and a removable and rotatable apertured closure therefor, whereby any desired compartment may be aligned with said apertures for dispensing the condiment selected.

Another object of the invention is to provide an improved multiple compartment condiment holder having radial compartments for holding various condiments, either in stick or powdered form, and a removable and rotatable cover for said holder having a single large dispensing opening and a series of small openings spaced therefrom, whereby the condiments in stick form may be removed when the compartment containing the same is aligned with the large opening, and the powdered condiments may be dispensed when the compartments holding them are aligned with the series of small openings.

A further object of the invention is to provide a multiple compartment condiment holder having a removable top formed with apertures for each compartment, and a rotatable cap closure mounted on said first mentioned top provided with a single large opening and with a spaced series of small openings formed therethrough adapted to selectively register with the openings in said removable top, whereby the selected condiment may be dispensed by aligning the dispensing openings in said rotatable cap closure member with the desired openings in the removable top.

Another object of the invention is to provide an improved multiple compartment condiment holder and dispenser which wi'l be highly efficient in operation, and relatively inexpensive to manufacture and produce.

Other objects will appear as the description proceeds.

In the accompanying drawings which form a part of this application,

Figure 1 is a plan view of the improved multiple compartment condiment holder and dispenser;

Figure 2 is a side elevation of the improved multiple compartment condiment holder and dispenser;

Figure 3 is a vertical sectional view taken on the line 3—3 of Figure 1;

Figure 4 is a transverse sectional view taken on the line 4—4 of Figure 2, and

Figure 5 is a transverse sectional view taken on the line 5—5 of Figure 2.

Like characters of reference are used throughout the following specification and the accompanying drawings to designate corresponding parts.

In carrying out the invention, there is provided an improved multiple compartment condiment holder and dispenser including a cylindrical hollow body 1 provided with an integrally formed centrally disposed upstanding post 2 having a series of radially extending partitions 3 attached thereto and to the inside wall of said body 1, as clearly illustrated in Figures 4 and 5 of the drawings. The centrally disposed post 2 and the radially extending partitions 3 extend flush with the top of the body 1, which is externally threaded as at 4 on its upper end.

The outer surface of the body 1 is formed with a series of vertically arranged roughened or stippled anti-slip grip areas 5 which are arranged opposite the outer ends of the radially extending partitions 3, to aid in securing a firm grasp on the body 1 of the holder when the same is to be used and operated.

A removable top 6 is provided for the body 1, and is formed with the depending threaded annular flange or collar 7 which is bent upon itself at its lower end as at 8 to reinforce the same. The top 6 will be threaded on the threaded upper end of the body 1, and will be formed with a series of radially extending openings 9 through it to overlie the several condiment holding compartments 10, formed in the body 1 between the adjacent radially extending partitions 3.

The rotatable cap closure member 11 will be supported in contact with and on the upper surface of the top 6, and will be formed with the central raised portion 12 which will act as a resilient means for holding the top 6 and cap member 11 in contact with each other. A depending locking flange 13 will be formed integrally with the cap closure member 11 and will be inturned as at 14 about its lower edge to underlie the shoulder 15 formed on the top 6 at the upper edge of its threaded portion.

A large radially extending dispensing opening 16 will be formed through the cap closure member 11 of a similar size as the opening 9 through the top 6. The closure member 11 may be rotated with respect to the top 6 to make the openings 16 align with any of the openings 9 which overlie the compartments 10 in which stick or leaf condiments are contained.

A series of small openings 18 will be formed through the cap closure member 11 for alignment with the openings 9 through the top 6 which overlies the compartments 10 in which powdered condiments such as salt and pepper are received, whereby the same may be dispensed. The arrangement of the large openings 16 and the small openings 18 is such that only the large openings 16 or the small openings 18 will be aligned with any one opening 9 in the top 6 at the same time.

A plurality of spaced outwardly extending gripping means 19 will be formed about the peripheral edge of the cap closure member 11 to prevent slipping when the same is grasped by one hand while the roughened gripping areas 5 on the body 1 are grasped by the other hand for rotation of the top closure member or cover member 11 with respect to the top 6 for aligning the openings in the top 6 and cap closure member 11 to dispense the desired condiment.

From the foregoing description, it will be apparent that there has been provided a highly efficient form of multiple compartment condiment holder which will be positive in action, and which may be constructed at a minimum of cost.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

A multiple compartment condiment holder including a body having an integrally formed center post and a group of radially extending partitions extending between said post and the inner surface of said body, a top removably supported on said body having outlet apertures formed therethrough overlying each compartment, a cover member secured on said top being rotatable with respect thereto, said cover member having a large single dispensing opening and a series of small openings spaced therefrom for selectively registering with the openings in said top, said group of openings and said large opening being spaced from each other a distance greater than the width of each compartment so that only the large single opening or the group of small openings may register with any of the openings in the top at one time, means integral with said cover and slidingly engaging said top for locking said cover member on said top, and anti-slipping lugs formed on the outer surfaces of said body and said cover member.

FRITZ VORSANGER.

REFERENCES CITED

The following references are of record in the file of this patent:

UNITED STATES PATENTS

| Number | Name | Date |
|---|---|---|
| D. 86,596 | Burt | Mar. 29, 1932 |
| 169,363 | Lomax | Nov. 2, 1875 |
| 1,208,189 | Miller | Dec. 12, 1916 |
| 1,216,252 | Ferguson | Feb. 13, 1917 |
| 1,267,564 | Livingston | May 28, 1918 |
| 1,724,028 | Kraft | Aug. 13, 1929 |
| 2,155,606 | Lewis | Apr. 25, 1939 |
| 2,302,186 | Caretto | Nov. 17, 1942 |

FOREIGN PATENTS

| Number | Country | Date |
|---|---|---|
| 79,958 | Sweden | Mar. 27, 1934 |